United States Patent [19]

Wu et al.

[11] Patent Number: 6,124,515
[45] Date of Patent: Sep. 26, 2000

[54] CATALYTIC CONVERSION OF A SATURATED HYDROCARBON TO AN AROMATIC HYDROCARBON

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 09/404,669

[22] Filed: Sep. 23, 1999

Related U.S. Application Data

[62] Division of application No. 08/941,764, Sep. 30, 1997, Pat. No. 5,990,032.

[51] Int. Cl.$^7$ ............................ C07C 2/52; C07C 6/00; C10G 35/06
[52] U.S. Cl. ........................ 585/418; 585/420; 585/421; 208/135; 208/136
[58] Field of Search ..................... 585/418, 420, 585/421; 208/135, 136

[56] References Cited

U.S. PATENT DOCUMENTS

| | | | |
|---|---|---|---|
| 5,258,348 | 11/1993 | Van Buren et al. | 502/328 |
| 5,482,910 | 1/1996 | Bricker et al. | 502/300 |
| 5,990,032 | 11/1999 | Wu et al. | 502/71 |

*Primary Examiner*—Marian C. Knode
*Assistant Examiner*—Thuan D. Dang
*Attorney, Agent, or Firm*—Kameron D. Kelly

[57] ABSTRACT

A catalyst composition, a process for producing the catalyst composition, and a hydroconversion process for converting a fluid stream comprising at least one saturated hydrocarbon to $C_6$ to $C_8$ aromatic hydrocarbons such as benzene, toluene, and xylenes are disclosed. The catalyst composition comprises a zeolite and a promoter. The process for producing the composition comprises the steps of: (1) combining a zeolite with a complexing ligand and a promoter compound under a condition sufficient to produce a modified zeolite; and (2) heating the modified zeolite to produce a promoted zeolite. The hydroconversion process comprises contacting a fluid stream with the catalyst composition under a condition sufficient to effect the conversion of a saturated hydrocarbon to a $C_6$ to $C_8$ aromatic hydrocarbon.

20 Claims, No Drawings

CATALYTIC CONVERSION OF A SATURATED HYDROCARBON TO AN AROMATIC HYDROCARBON

This application is a divisional of application Ser. No. 08/941,764, filed Sept. 30, 1997 now U.S. Pat. No. 5,990,032.

FIELD OF THE INVENTION

This invention relates to a composition useful for converting a hydrocarbon to a $C_6$ to $C_8$ aromatic hydrocarbon and an olefin, to a process for producing the composition, and to a process for using the composition for converting a hydrocarbon to a $C_6$ to $C_8$ aromatic hydrocarbon and an olefin.

BACKGROUND OF THE INVENTION

It is well known to those skilled in the art that aromatic hydrocarbons and olefins are each a class of very important industrial chemicals which find a variety of uses in petrochemical industry. It is also well known to those skilled in the art that catalytically cracking gasoline-range hydrocarbons produces lower olefins such as, for example, propylene; and aromatic hydrocarbons such as, for example, benzene, toluene, and xylenes (hereinafter 2 collectively referred to as BTX) in the presence of catalysts which contain a zeolite. The product of this catalytic cracking process contains a multitude of hydrocarbons including unconverted $C_5$+alkanes; lower alkanes such as methane, ethane, and propane; lower alkenes such as ethylene and propylene; $C_6$–$C_8$ aromatic hydrocarbons; and $C_9$+aromatic compounds which contain 9 or more carbons per molecule. Recent efforts to convert gasoline to more valuable petrochemical products have therefore focused on improving the conversion of gasoline to olefins and aromatic hydrocarbons by catalytic cracking in the presence of zeolite catalysts. For example, a gallium-promoted zeolite ZSM-5 has been used in the so-called Cyclar Process to convert a hydrocarbon to BTX.

Olefins and aromatic hydrocarbons can be useful feedstocks for producing various organic compounds and polymers. However, a zeolite catalyst is generally deactivated in a rather short period, especially in a high sulfur and/or high polyaromatic environment, because of depositions of carbonaceous material, generally coke, on the surface of the catalyst. Therefore, development of a catalyst and a process for converting hydrocarbons to the more valuable olefins and BTX and for reducing coke deposition would be a significant contribution to the art and to the economy.

SUMMARY OF THE INVENTION

An object of this invention is to provide a catalyst composition which can be used to convert a hydrocarbon to a $C_6$ to $C_8$ aromatic hydrocarbon and an olefin. Also an object of this invention is to provide a process for producing the catalyst composition. Another object of this invention is to provide a process which can employ the catalyst composition to convert a hydrocarbon to an olefin and a $C_6$ to $C_8$ aromatic hydrocarbon. An advantage of the catalyst composition is that it suppresses the deposition of coke during a hydrocarbon conversion process. Other objects and advantages will becomes more apparent as this invention is more fully disclosed hereinbelow.

According to a first embodiment of the present invention, a composition which can be used as a catalyst for converting a hydrocarbon or a hydrocarbon mixture to an olefin and a $C_6$ to $C_8$ aromatic hydrocarbon is provided. The composition comprises a zeolite, and at least one metal or element selected from the group consisting of Group IA, Group IIA, Group IIIA, Group IVA, Group VA, Group IIB, Group IIIB, Group IVB, Group VIB, of the Periodic Table of the Elements, CRC Handbook of Chemistry and Elements, 67th edition, 1986–1987 (CRC Press, Boca Raton, Fla.), and combinations of two or more thereof.

According to a second embodiment of the present invention, a process which can be used for producing a catalyst composition is provided. The process comprises the steps: (1) optionally contacting a zeolite with steam whereby a steamed zeolite is formed; (2) optionally contacting a zeolite or the steamed zeolite with an acid in an amount and under a condition effective to produce an acid-leached zeolite; (3) combining a zeolite, which can also be the steamed zeolite or the acid-leached zeolite, with a coke-suppressing amount of a promoter compound under a condition sufficient to produce a modified zeolite; and (4) heat-treating the modified zeolite to produce a promoted zeolite wherein the promoter is selected from the group consisting of Group IA, Group IIA, Group IIIA, Group IVA, Group VA, Group IIB, Group IIIB, Group IVB, Group VIB, of the Periodic Table of the Elements, CRC Handbook of Chemistry and Elements, 67th edition, 1986-1987 (CRC Press, Boca Raton, Fla.), and combinations of two or more thereof.

According to a third embodiment of the present invention, a process which can be used for converting a hydrocarbon or a hydrocarbon mixture to an olefin and a $C_6$ to $C_8$ aromatic hydrocarbon is provided which comprises, consists essentially of, or consists of, contacting a fluid which comprises a hydrocarbon or a hydrocarbon mixture with a catalyst composition, which can be the same as disclosed above in the first embodiment of the invention, under a condition effective to convert a hydrocarbon to an olefin and an aromatic hydrocarbon containing 6 to 8 carbon atoms per molecule.

DETAILED DESCRIPTION OF THE INVENTION

The catalyst composition of the first embodiment of the present invention can comprise, consist essentially of, or consist of, a zeolite and a promoter selected from the group consisting of Group IA, Group IIA, Group IIIA, Group IVA, Group VA, Group IIB, Group IIIB, Group IVB, Group VIB, of the Periodic Table of the Elements, and combinations of two or more thereof. The term "promoter" refers to a compound, a metal, or an element that, when incorporated in a zeolite, can suppress coke formation in a hydrocarbon conversion process. The term "metal or element" used herein also includes a compound of the metal or element. For the interest of simplicity, any references to "metal" in the application, unless otherwise indicated, will include the elements listed above and a compound of any of the elements.

The weight ratio of each promoter to zeolite can be any ratio as long as the ratio can suppress the coke formation during a hydrocarbon conversion process. The ratio is also preferably a ratio that can bind the promoter such a way that the composition can retain at least about 75, preferably about 85, more preferably 90, and most preferably 90 weight % of the promoter when a used composition is regenerated after being used in a hydrocarbon conversion process. Generally, the ratio can be in the range of from about 0.001:1 to about 1:1, preferably about 0.005:1 to about 1:1, and most preferably 0.01:1 to 0.5:1. The composition can also comprise, consist essentially of, or consist of a zeolite, a promoter, and a binder. The weight of the binder generally can be in the range of from about 1 to about 50, preferably about 5 to about 40, and most preferably 5 to 35 grams per 100 grams of the composition.

Any binders known to one skilled in the art for use with a zeolite are suitable for use herein. Examples of suitable binders include, but are not limited to, clays such as for example, kaolinite, halloysite, vermiculite, chlorite, attapulgite, smectite, montmorillonite, illite, saconite, sepiolite, palygorskite, and combinations of any two or more thereof; aluminas such as for example ($\alpha$-alumina and $\gamma$-alumina; silicas; alumina-silica; aluminum phosphate; aluminum chlorohydrate; and combinations of two or more thereof. Because these binders are well known to one skilled in the art, description of which is omitted herein. The presently preferred binder, if employed, is alumina or silica because it is readily available.

The composition can further be characterized by having the following physical characteristics: a surface area as determined by the BET method using nitrogen in the range of from about 200 to about 600, preferably 300 to 500 m$^2$/g; a pore volume in the range of from about 0.4 to about 0.8, preferably about 0.5 to about 0.75, and most preferably 0.6 to 0.75 ml/g; an average pore diameter in the range of from about 5 to about 300, preferably about 10 to about 250, and most preferably 20 to 200 Å; and a porosity of more than about 50%.

According to the present invention, any metal or element, or a compound thereof, selected from the group consisting of Group IA, Group IIA, Group IIIA, Group IVA, Group VA, Group IIB, Group IIIB, Group IVB, Group VIB, of the Periodic Table of the Elements, and combinations of two or more thereof can be used as promoter. The presently preferred promoter is zinc or a zinc compound.

Any commercially available zeolite which can catalyze the conversion of a hydrocarbon to an aromatic compound and an olefin can be employed in the present invention. Examples of suitable zeolites include, but are not limited to, those disclosed in Kirk-Othmer Encyclopedia of Chemical Technology, third edition, volume 15 (John Wiley & Sons, New York, 1991) and in W. M. Meier and D. H. Olson, "Atlas of Zeolite Structure Types," pages 138–139 (Butterworth-Heineman, Boston, Mass., 3rd ed. 1992). Optionally a zeolite can be steam—and/or acid—treated before using the present invention. The presently preferred zeolites are those having medium pore sizes and having the physical characteristics disclosed above. ZSM-5 and similar zeolites that have been identified as having a framework topology identified as MFI are particularly preferred because of their shape selectivity.

The composition of the present invention can be prepared by combining a zeolite, a promoter, and optionally a binder in the weight ratios or percent disclosed above by any methods known to one skilled in the art and under any conditions sufficient to effect the production of such a composition. However, it is preferred that the composition be prepared by the process disclosed in the second embodiment of the invention.

According to the second embodiment of the present invention, a zeolite, preferably a ZSM-5 zeolite, a promoter, and optionally a binder can be well mixed at about 15 to about 100° C. under atmospheric pressure, generally in a liquid such as water or a hydrocarbon, by any means known to one skilled in the art such as stirring, blending, kneading, or extrusion, following which the resulting mixture can be dried in air at a temperature in the range of from about 20 to about 800° C., for about 0.5 to about 50 hours under any pressures that accommodate the temperatures, preferably under atmospheric pressure. hereafter, the dried, zeolite-binder mixture can be further heat-treated at a temperature in the range of from about 200 to 1000° C., preferably about 250 to about 750° C., and most preferably 350 to 650° C. for about 1 to about 30 hours to prepare the present composition. The heat treatment can be carried out by air calcination or steam.

Generally a zeolite, before a binder is combined with the zeolite, can also be calcined under similar conditions to remove any contaminants, if present, to prepare a calcined zeolite.

A zeolite, whether it has been calcined or contains a binder, can also be treated with steam. The treatment of a zeolite, which can contain a binder, with steam can be carried out in any suitable container or vessel known to one skilled in the art at about 100° C. to about 1000° C. for about 1 to about 30 hours under any pressure that can accommodate the temperatures to produce a steamed zeolite.

A zeolite, whether it has been steamed or not, can be treated with an acid before the preparation of the present composition. Generally, any organic acids, inorganic acids, or combinations of any two or more thereof can be used in the process of the present invention so long as the acid can reduce the aluminum content in the zeolite. The acid can also be a diluted aqueous acid solution. Because acid treatment of zeolites is well known to one skilled in the art, description of which is omitted herein for the interest of brevity. Thereafter, the acid-treated zeolite material can be washed with running water for 1 to about 60 minutes followed by drying, at about 50 to about 1000, preferably about 75 to about 750, and most preferably 100 to 650° C. for about 0.5 to about 15, preferably about 1 to about 12, and most preferably 1 to 10 hours, to produce an acid-leached zeolite. Any drying method known to one skilled in the art such as, for example, air drying, heat drying, spray drying, fluidized bed drying, or combinations of two or more thereof can be used.

It should be noted that, a zeolite can be acid-leached before it is treated with steam.

The dried, acid-leached zeolite, whether it has been further washed with a mild acid or not, can be either heated with steam or calcined, if desired, under a condition known to those skilled in the art. Generally such a condition can include a temperature in the range of from about 250 to about 1,000, preferably about 350 to about 750, and most preferably 450 to 650° C. and a pressure in the range of from about 0.5 to about 50, preferably about 0.5 to about 30, and most preferably 0.5 to 10 atmospheres (atm) for about 1 to about 30 hours, preferably about 2 to about 20 hours, and most preferably 3 to 15 hours.

A zeolite, a calcined zeolite, or a calcined zeolite-binder mixture, can be treated with a compound containing an exchangeable ammonium ion to prepare an ammonium-exchanged zeolite. Whether a zeolite is calcined or contains a binder, the process or treatment in the second embodiment is the same for each. For the interest of brevity, only a zeolite is described hereinbelow. Examples of suitable ammonium-containing compounds include, but are not limited to, ammonium sulfate, ammonium chloride, ammonium nitrate, ammonium bromide, ammonium fluoride, and combinations of any two or more thereof. Treatment of the zeolite replaces the original ions such as, for example, alkali or alkaline earth metal ions of the zeolite, with predominantly ammonium ions. Techniques for such treatment are well known to one skilled in the art such as, for example, ion exchange of the original ions. For example, a zeolite can be contacted with a solution containing a salt of the desired replacing ion or ions.

Generally, a zeolite can be suspended in an aqueous solution of an ammonium-containing compound. The concentration of the zeolite in the aqueous solution can be in the range of from about 0.01 to about 800, preferably about 0.1 to about 500, more preferably about 1 to about 400, and most preferably 5 to 100 grams per liter. The amount of the ammonium-containing compound required depends on the amount of the original ion(s) to be exchanged. Upon the preparation of the solution, the solution can be subject to a temperature in the range of from about 30° C. to about 200° C., preferably about 40° C. to about 150° C., and most preferably 50° C. to 125° C. for about 1 to about 100 hours, preferably about 1 to about 50 hours, and most preferably 2 to 25 hours depending on desired degrees of ion exchange. The treatment can be carried out under a pressure in the range of from about 1 to about 10 atmospheres (atm), preferably about 1 atm or any pressure that can maintain the required temperature. Thereafter, the treated zeolite can be washed with running water for 1 to about 60 minutes followed by drying and calcining to produce calcined hydrogen-form zeolite. For the preparation of a calcined zeolite or zeolite-binder the drying and calcining processes can be carried out substantially the same as those disclosed above.

Generally, the ammonium-exchanged zeolite becomes hydrogen exchanged upon calcination or high temperature treatment such that a predominant proportion of its exchangeable cations are hydrogen ions. The above-described ion exchange of exchangeable ions in a zeolite is well known to one skilled in the art, therefore, the description of which is omitted herein for the interest of brevity.

In the second embodiment of the invention, a zeolite or a zeolite-binder mixture, which could have been steamed and/or acid-leached, in a desired ionic form, regardless whether calcined or not, can be combined with a promoter compound, preferably in the presence of a complexing ligand, to produce a modified zeolite. A modified zeolite can also be produced by contacting a zeolite with a promoter compound, in a solution or suspension, under a condition known to those skilled in the art to incorporate a promoter compound into a zeolite. Because the methods for incorporating or impregnating a promoter compound into a zeolite such as, for example, impregnation by incipient wetness method, are well known to those skilled in the art, the description of which is also omitted herein for the interest of brevity.

According to the present invention, any compound containing a metal or element selected from the group consisting of Group IA, Group IIA, Group IIIA, Group IVA, Group VA, Group IIB, Group IIIB, Group IVB, Group VIB, and combinations of two or more thereof, of the Periodic Table of the Elements can be used as promoter compound. Illustrated hereinbelow are some examples of suitable promoter compound.

Any zinc-containing compounds which can, when incorporated into a zeolite, reduce coke formation in a hydrocarbon conversion reaction can be used in the present invention. Examples of suitable zinc-containing compounds include, but are not limited to, zinc nitrate, zinc titanate, zinc silicate, zinc borate, zinc fluorosilicate, zinc fluorotitanate, zinc molybdate, zinc chromate, zinc tungstate, zinc zirconate, zinc chromite, zinc aluminate, zinc phosphate, zinc acetate dihydrate, diethylzinc, zinc 2-ethylhexanoate, and combinations of two or more thereof.

Also any titanium-containing compounds that, when incorporated into a zeolite, reduce coke formation in a hydrocarbon conversion reaction can be employed in the invention. Examples of suitable titanium-compounds include, but are not limited to, titanium zinc titanate, lanthanum titanate, titanium tetramides, titanium tetramercaptides, titanium chloride, titanium oxalate, zinc titanate, tetraisopropyl titanate, tetra-n-butyl titanate, tetrakis(2-ethylhexyl) titanate, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide, titanium tetraphenoxide, and combinations of two or more thereof.

Similarly, examples of suitable magnesium-containing compounds include, but are not limited to, magnesium silicate, magnesium nitrate, magnesium acetate, magnesium acetylacetoante, magnesium chloride, magnesium molybdate, magnesium hydroxide, magnesium sulfate, magnesium sulfide, magnesium titanate, magnesium tungstate, magnesium formate, magnesium bromide, magnesium bromide diethyl etherate, magnesium fluoride, dibutyl magnesium, magnesium methoxide, $Mg(OC_2H,)_2$, $Mg(OSO_2CF_3)_2$, dipropyl magnesium, and combinations of two or more thereof.

Generally any silicon-containing compounds which are effective to suppress coke formation on a zeolite in a hydrocarbon conversion process can be used in the present invention. Examples of suitable silicon-containing compounds can have a formula of $(R)(R)(R)Si-(O_mSi(R)(R))_nR$ wherein each R can be the same or different and is independently selected from the group consisting of hydrogen, alkyl radicals, alkenyl radicals, aryl radicals, alkaryl radicals, aralkyl radicals, and combinations of any two or more thereof; m is 0 or 1; and n is 1 to about 10 wherein each radical can contain 1 to about 15, preferably 1 to about 10 carbon atoms per radical. Specific examples of such compounds include, but are not limited to, silicon-containing polymers such as poly(phenylmethylsiloxane), poly(phenylethylsiloxane), poly(phenylpropylsiloxane), hexamethyldisiloxane, decamethyltetrasiloxane, diphenyltetramethyldisiloxane, and combinations of any two or more thereof. Other silicon-containing compounds include organosilicates such as, for example, tetraethyl orthosilicate. A number of well known silylating agents such as trimethylchlorosilane, chloromethyldimethylchlorosilane, N-trimethylsilylimidazole, N,O-bis(trimethylsilyl) acetimide, N-methyl-N-trimethylsilyltrifluoroacetamide, t-butyldimethylsilylimidazole, N-trimethylsilylacetamide, methyltrimethoxysilane, vinyltriethoxysilane, ethyltrimethoxysilane, propyltrimethoxysilane, (3,3,3-trifluoropropyl)trimethoxysilane, [3-(2-aminoethyl) aminopropyl]trimethoxysilane, cyanoethyltrimethoxysilane, aminopropyltriethoxysilane, phenyltrimethoxysilane, (3-chloropropyl)trimethoxysilane, (3-mercaptopropyl) trimethoxysilane, (3-glycidoxypropyl)trimethoxysilane, vinyltris(β-methoxyethoxy)silane, (γ-methacryloxypropyl) trimethoxysilane, vinylbenzyl cationic silane, (4-aminopropyl)triethoxysilane, [γ-(β-aminoethylamino) propyl]trimethoxysilane, (γ-glycidoxypropyl)

trimethoxysilane, [β-(3,4-epoxycyclohexyl)ethyl] trimethoxysilane, (β-mercaptoethyl)trimethoxysilane, (γ-chloropropyl)trimethoxysilane, and combinations of any two or more thereof can also be employed. The presently preferred silicon-containing compounds are tetraethyl orthosilicate and poly(phenylmethyl) siloxane.

Similarly, any phosphorus-containing compounds that, when impregnated onto or incorporated into a zeolite can be converted into a phosphorus oxide, are capable of reducing coke deposition on a zeolite, as compared to the use of the zeolite, can be used in the present invention. Examples of suitable phosphorus-containing compounds include, but are not limited to, phosphorus pentoxide, phosphorus oxychloride, phosphoric acid, phosphites $P(OR)_3$ such as triethyl phosphite $P(OR)_3$, phosphates $P(O)(OR)_3$ such as triethyl phosphate and tripropyl phosphate, $P(O)(R)_3$, phosphines $P(R)_3$, and combinations of any two or more thereof wherein R is the same as that disclosed above.

Examples of suitable boron-containing compounds include, but are not limited to boric acid, borane-ammonium complex, boron trichloride, boron phosphate, boron nitride, triethyl borane, trimethyl borane, tripropyl borane, trimethyl borate, triethyl borate, tripropyl borate, trimethyl boroxine, triethyl boroxine, tripropyl boroxine, and combinations of any two or more thereof.

Similarly, examples of suitable tin-containing compounds include, but are not limited to, stannous acetate, stannic acetate, stannous bromide, stannic bromide, stannous chloride, stannic chloride, stannous oxalate, stannous sulfate, stannic sulfate, stannous sulfide, and combinations of any two or more thereof.

Similarly, examples of suitable zirconium-containing compounds include, but are not limited to, zirconium acetate, zirconium formate, zirconium chloride, zirconium bromide, zirconium butoxide, zirconium tert-butoxide, zirconium chloride, zirconium citrate, zirconium ethoxide, zirconium methoxide, zirconium propoxide, and combinations of any two or more thereof.

Suitable molybdenum-containing compounds include, but are not limited to, molybdenum chloride, molybdenum acetate, molybdenum fluoride, molybdenum oxychloride, molybdenum sulfide, ammonium heptamolybdate and combinations of two or more thereof.

Examples of suitable germanium-containing compounds include, but are not limited to, germanium chloride, germanium bromide, germanium ethoxide, germanium fluoride, germanium iodide, germanium methoxide, and combinations of any two or more thereof.

Examples of suitable indium-containing compounds include, but are not limited to indium acetate, indium bromide, indium chloride, indium fluoride, indium iodide, indium nitrate, indium phosphide, indium selenide, indium sulfate, and combinations of any two or more thereof.

Examples of suitable lanthanum-containing compounds include, but are not limited to, lanthanum acetate, lanthanum carbonate, lanthanum octanoate, lanthanum fluoride, lanthanum chloride, lanthanum bromide, lanthanum iodide, lanthanum nitrate, lanthanum perchlorate, lanthanum sulfate, tanthanum titanate, and combinations of any two or more thereof.

Examples of suitable chromium-containing compounds include, but are not limited to, chromium acetate, chromium acetylacetonate, chromium chloride, chromium fluoride, chromium hexacarbonyl, chromium nitrate, chromium nitride, chromium 2,4-pentanedionate, chromium perchlorate, chromium potassium sulfate, chromium sulfate, chromium telluride, and combinations of two or more thereof.

Other suitable promoter compounds include, but are not limited to, sodium acetate, sodium acetylacetonate, sodium bromide, sodium iodide, sodium nitrate, sodium sulfate, sodium sulfide, potassium acetate, potassium acetylacetonate, potassium bromide, potassium chloride, potassium nitrate, potassium octanoate, potassium phosphate, potassium sulfate, tungsten bromide, tungsten chloride, tungsten hexacarbonyl, tungsten oxychloride, tungsten sulfide, tungstic acid, and combinations of any two or more thereof.

The quantity of a promoter compound required is generally a quantity that can result in a promoter having the property of reducing coke formation when the composition of the invention is used in a hydrocarbon conversion process. Generally, the weight ratio of a promoter compound is the ratio that can result in the weight ratio of promoter to zeolite disclosed in the first embodiment of the invention.

The complexing ligand that can be used in the present invention can be any complexing ligand that is capable of chelating a metal compound. A suitable complexing ligand can be a carboxylic acid or derivatives thereof. A suitable complexing agent can also be an amine or an acid containing one or more hydroxy group that can chelate the metal moiety of a metal compound. Examples of complexing ligands include, but are not limited to ethylenediaminetetraacetic acid, a metal or ammonium salt of ethylenediaminetetraacetic acid, hydroxyethyl glycine, lactic acid, ammonium lactate, sodium lactate, potassium lactate, citric acid, ammonium, potassium or sodium citrate, isocitric acid, ammonium, potassium or sodium isocitrate, malic acid, ammonium, potassium or sodium malate, tartaric acid, ammonium, potassium or sodium tartrate, triethanolamine, malonic acid, ammonium, potassium or sodium malonate, and combinations of two or more thereof. The presently preferred complexing ligand is ethylenediaminetetraacetic acid or a salt thereof because of its ready availability and low cost.

When a complexing ligand is employed, the molar ratio of the complexing ligand to the promoter compound can be any ratio so long as the ratio can reduce the loss of the promoter of the invention composition disclosed in the first embodiment of the invention when a used composition, of the invention, is regenerated after being used in a hydrocarbon conversion process. The ratio can generally be in the range of from about 0.01:1 to about 100:1 and preferably about 0.1:1 to about 10:1.

A complexing ligand can be combined with a promoter compound and a zeolite under any suitable manner known to one skilled in the art. The combination can be carried out in a liquid such as water, or a basic solution such as ammonium hydroxide, or an acidic solution. The presently preferred liquid is a basic solution. One such combination is impregnation as disclosed above and can be carried out under any suitable conditions known to one skilled in the art.

The combinations of a zeolite, a promoter compound, and a complexing ligand can be carried out under any suitable conditions known to one skilled in the art such as a temperature in the range of about 15 to about 100° C., under a pressure of about 0.5 to about 10 atm (atmospheres) for about 0.01 to about 20 hours.

When a modified zeolite is produced, the modified zeolite can be subject to a heat treatment to convert the promoter compound into the promoter disclosed in the first embodiment of the invention. Heat treatment can be air calcination or steaming under the conditions disclosed above.

The composition of the invention then can be, if desired, pretreated with a reducing agent before being used in a hydrocarbon conversion process for converting a hydrocarbon to an aromatic hydrocarbon. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 650° C. for 1 to 5 hours. The treatment with a reducing agent can also be carried out in-situ in a reactor which is used for a hydrocarbon conversion process.

According to the third embodiment of the present invention, a process useful for converting a saturated hydrocarbon or a hydrocarbon mixture containing a saturated hydrocarbon to a $C_6$ to $C_8$ aromatic hydrocarbon comprises, consists essentially of, or consists of contacting a fluid stream comprising a saturated hydrocarbon or hydrocarbon mixture containing a saturated hydrocarbon which can comprise paraffins, olefins, naphthenes, and aromatic compounds with a catalyst composition under a condition sufficient to effect the conversion of a saturated hydrocarbon or a hydrocarbon mixture containing a saturated hydrocarbon to $C_6$ to $C_8$ aromatic hydrocarbons or to suppress the coke deposition or formation on the catalyst composition. The fluid stream also comprises a diluent selected from the group consisting of carbon dioxide, nitrogen, helium, carbon monoxide, steam, hydrogen, and combinations of two or more thereof. The presently preferred diluents are nitrogen and carbon dioxide for they are readily available and effective. The catalyst composition can be the same as that disclosed in the first embodiment of the invention and can be produced by the second embodiment of the invention. The weight ratio of the diluent to the hydrocarbon is in the range of from about 0.01:1 to about 10:1, preferably about 0.05:1 to about 5:1, and most preferably 0.1:1 to about 2:1.

The term "fluid" is used herein to denote gas, liquid, vapor, or combinations thereof. The term "hydrocarbon" is generally referred to, unless otherwise indicated, as one or more hydrocarbons having from about 2 carbon atoms to about 20 carbon atoms, preferably about 2 to about 15 carbon atoms, and most preferably 2 to 10 carbon atoms per molecule. Examples of a hydrocarbon include, but are not limited to ethane, propane, butane, isobutane, pentane, isopentane, hexane, isohexane, cyclohexane, heptane, isoheptane, octane, isooctane, nonane, decane, undecane, dodecane, tridecane, tetradecane, pentadecane, hexadecane, butenes, isobutene, pentenes, hexenes, benzene, toluene, ethylbenzene, xylenes, and combinations of any two or more thereof.

Any fluid which contains a saturated hydrocarbon as disclosed above can be used as the feed for the process of this invention. Generally, the fluid feed stream can also contain olefins, naphthenes (cycloalkanes), or some aromatic compounds. Examples of suitable, available fluid feeds include, but are not limited to, gasolines from catalytic oil cracking processes, pyrolysis gasolines from thermal cracking of saturated hydrocarbons, naphthas, gas oils, reformates, and combinations of any two or more thereof. The origin of this fluid feed is not critical. Though particular composition of a feed is not critical, a preferred fluid feed is derived from gasolines which generally contain more paraffins (alkanes) than combined content of olefins and aromatic compounds (if present).

The contacting of a fluid feed stream containing a hydrocarbon with the catalyst composition can be carried out in any technically suitable manner, in a batch or semicontinuous or continuous process, under a condition effective to convert a saturated hydrocarbon to a $C_6$ to $C_8$ aromatic hydrocarbon. Generally, a fluid stream as disclosed above, preferably being in the vaporized state, is introduced into an aromatization reactor having a fixed catalyst bed, or a moving catalyst bed, or a fluidized catalyst bed, or combinations of any two or more thereof by any means known to one skilled in the art such as, for example, pressure, meter pump, and other similar means. Because an aromatization reactor and aromatization are well known to one skilled in the art, the description of which is omitted herein for the interest of brevity. The condition can include a weight hourly space velocity of the fluid stream in the range of about 0.01 to about 100, preferably about 0.05 to about 50, and most preferably 0.1 to 30 g feed/g catalyst/hour. Generally, the pressure can be in the range of from about 0 to about 1000 psig, preferably about 0 to about 200 psig, and most preferably 0 to 50 psig, and the temperature is about 250 to about 1000° C., preferably about 350 to about 750° C., and most preferably 450 to 650° C.

The process effluent generally contains a light gas fraction comprising hydrogen and methane; a $C_2$–$C_3$ fraction containing ethylene, propylene, ethane, and propane; an intermediate fraction including non-aromatic compounds higher than 3 carbon atoms; and a BTX aromatic hydrocarbons fraction (benzene, toluene, ortho-xylene, meta-xylene and para-xylene). Generally, the effluent can be separated into these principal fractions by any known methods such as, for example, fractionation distillation. Because the separation methods are well known to one skilled in the art, the description of which is omitted herein. The intermediate fraction can be recycled to an aromatization reactor described above, methane, ethane, and propane can be used as fuel gas or as a feed for other reactions such as, for example, in a thermal cracking process to produce ethylene and propylene. The olefins can be recovered and further separated into individual olefins by any method known to one skilled in the art. The individual olefins can then be recovered and marketed. The BTX fraction can be further separated into individual $C_6$ to $C_8$ aromatic hydrocarbon fractions. Alternatively, the BTX fraction can undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to para-xylene.

After the catalyst composition has been deactivated by, for example, coke deposition or feed poisons, to an extent that the feed conversion and/or the selectivity to the desired ratios of olefins to BTX have become unsatisfactory, the catalyst composition can be regenerated or reactivated by any means known to one skilled in the art such as, for example, calcining in air to burn off deposited coke and other carbonaceous materials, such as oligomers or polymers, preferably at a temperature of about 300 to about 1000° C. The optimal time periods of the calcining depend generally on the types and amounts of deactivating deposits on the catalyst composition and on the calcination temperatures. These optimal time periods for the regeneration can easily be determined by those possessing ordinary skills in the art and are omitted herein for the interest of brevity.

The following examples are presented to further illustrate this invention and are not to be construed as unduly limiting the scope of the present invention.

EXAMPLE I

This example illustrates the preparation of two zinc-promoted ZSM-5 catalyst materials.

Catalyst A (comparison) was prepared as follows: A quantity of 50 grams of a commercial ZSM-5 (MFI) zeolite (provided by UOP, Des Plains, Ill., under the product designation "MFI-38") was mixed with 50 grams of an aqueous colloidal solution of silica (containing about 40 weight % silica; a product of E. I. DuPont de Nemours and Company, marketed by Aldrich Chemical Company, Milwaukee, Wis., under the product designation "Ludox® hydrogen content on a Carle gas chromatograph using a hydrocarbon trap followed by a 13X molecular sieve column. Pertinent test results after run times of about 5 hours are summarized in Table I.

TABLE I

| Catalyst | Weight % of Components in Product | | | | | | | | Coke[a] |
|---|---|---|---|---|---|---|---|---|---|
| | Methane/Ethane | Ethylene | Propane | Propylene | Butanes | Benzene | Toluene | $C_8$ Aromatics | (%/hr.) |
| A (Control) | 50.5 | 0.9 | 4.9 | 0.8 | 0.1 | 15.5 | 18.8 | 8.5 | 0.18 |
| B (Invention) | 41.0 | 0.4 | 4.3 | 0.6 | 0.1 | 17.0 | 19.3 | 7.3 | 0.10 |

[a]Determined by weighing the used (spent) catalyst at the end of a test run, subtracting the weight of the fresh catalyst in the reactor from the weight of the spent catalyst in the reactor; and dividing the weight difference (equivalent to the amount of coke on the catalyst) by the duration of the test (in hours) and multiplying by 100.

AS-40"). The obtained mixture was extruded to make 1/16 inch extrudates. The extrudates were calcined in air at 538° C. for 6 hours.

A quantity of 3.0 grams of the calcined silica-bound ZSM-5 extrudates was impregnated with 1.74 grams of an aqueous solution containing 20 weight % $Zn(NO_3)_2.6H_2O$. The zinc-impregnated zeolite material was dried and calcined in air at 538° C. for 6 hours. Catalyst A contained 1.94 weight % Zn, 36.4 weight % Si and 1.32 weight % Al (as measured by X-ray diffraction analysis).

Catalyst B (invention) was prepared as follows: A quantity of 3.0 grams of calcined silica-bound ZSM-5 extrudates (described above) was impregnated with a solution containing 20 weight % $Zn(NO_3)_2.6H_2O$ and 12.5 weight % EDTA (ethylenediaminetetraacetic acid). This impregnating solution had been prepared by mixing 6.00 grams of $Zn(NO_3)_2.6H_2O$, 6.00 grams of water, 3.75 grams of EDTA, and 14.25 grams of an aqueous 28 weight % $NH_4OH$ solution. The molar ratio of Zn to EDTA in the obtained clear mixture was about 2:1; the pH was 8.8. The zinc/EDTA-impregnated zeolite material was dried and calcined in air at 638° C. for 6 hours. Catalyst B contained 1.81 weight % Zn, 36.80 weight % Si and 1.33 weight % Al (as per X-ray diffraction analysis).

EXAMPLE II

This example illustrates the use of the catalysts of Example I in the aromatization of propane.

A stainless steel reactor tube (inner diameter: 1 cm; length: 60 cm) was filled with 3.0 grams of either Catalyst A or Catalyst B. The catalyst was pretreated with a stream of hydrogen gas (flow rate: 6 liters per hour) at a temperature which was raised from room temperature to about 550° C. at a rate of 10° C. per minute. When the reaction temperature (about 550° C.) had been reached, propane gas (density: 1.832 g/l) and hydrogen gas were introduced into the reactor. The flow rate of propane was 6.1 to 6.8 liters per hour (equivalent to a weight hourly space velocity of propane of about 4 grams propane per gram catalyst per hour). The flow rate of $H_2$ was about 6.0 liters per hour. The reaction pressure was about 0 psig.

The reactor effluent was cooled and separated into a gaseous phase and a liquid phase by passing it through a wet ice trap for liquid product collection and then through a wet test meter for gas volume measurement. The liquid was weighed hourly and analyzed on a Hewlett-Packard 5890 gas chromatograph equipped with a fused silica column (DB-1). The gas was sampled hourly and analyzed on a Hewlett-Packard 5890 gas chromatograph using a HP-PLOT/$Al_2O_3$ column. The gas was also analyzed for Test results in Table I indicate that both catalysts achieved comparable propane conversion (95–96%) and comparable yields of BTX (benzene+toluene+xylenes; about 43 weight %). However, invention Catalyst B produced less undesirable coke as well as undesirable methane and ethane than Catalyst A. Catalyst B therefore deactivates less rapidly than Catalyst A and can be used for longer periods of time before regeneration (by calcination in air) is required because of the lower coking rate.

EXAMPLE III

This example illustrates how firmly the zinc promoter was bound within the two Zn-promoted ZSM-5 catalysts which were used in the aromatization of propane (described above).

The zinc content of Catalysts A and B were determined by X-ray diffraction before each aromatization test described in Example II. Then each used ("spent") catalyst was calcined in air at 538° C. for 1 hour (so as to simulate the regeneration of each catalyst) and the zinc content in the regenerated catalysts was determined (also by X-ray diffraction).

Thereafter, a major portion of regenerated Catalysts A and B were washed three times with 100 ml of an aqueous 1.0 molar solution of $(NH_4)_2CO_3$. This washing procedure was carried out at 60° C. for about 0.5 hour. The thus-w hours. The zinc content in the calcined, washed catalysts was then determined (also by X-ray diffraction). Test results are summarized in Table II.

TABLE II

| | Weight % Zn in | | |
|---|---|---|---|
| Catalyst | Fresh Catalyst | Regenerated Catalyst | $(NH_4)_2CO_3$— Washed Catalyst |
| A (Control) | 1.9 | 1.4 | 0.7 |
| B (Invention) | 1.8 | 1.7 | 1.6 |

Test data in Table II indicate that zinc was more tightly bound (thus less volatile) in Catalyst B (prepared by using zinc nitrate and EDTA) than in Catalyst A (prepared by using only zinc nitrate without EDTA), and that zinc losses during regeneration (by calcination) were less in Catalyst B than in Catalyst A. These results indicate that the catalyst of this invention can be employed for longer periods of time before it permanently deactivates due to zinc losses.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process comprising contacting a fluid which comprises a saturated hydrocarbon which is selected from the group consisting of ethane, propane, butane, isobutane, pentane, isopentane, hexane, isohexane, heptane, isoheptane, octane, isooctane, nonane, decane, undecane, dodecane, tridecane, tetradecane, pentadecane, and hexadecane with a catalyst composition under a condition sufficient to convert said saturated hydrocarbon to a $C_6$ to $C_8$ aromatic hydrocarbon wherein said catalyst composition is prepared by the steps which comprises: (1) combining a zeolite, a promoter compound, and a complexing ligand to produce a modified zeolite; and thereafter (2) heating said modified zeolite to produce a promoted zeolite wherein said promoter compound comprises a compound selected from the group consisting of Group IA compounds, Group IIA compounds, Group IIIA compounds, Group IVA compounds, Group VA compounds, Group IIB compounds, Group IIIB compounds, Group IVB compounds, Group VIB compounds, and combinations of two or more thereof; said complexing ligand is selected from the group consisting of a carboxylic acid, a derivative of a carboxylic acid, an amine containing one or more hydroxy groups, and combinations of two or more thereof; and said catalyst preparation is carried out under a condition sufficient to incorporate said promoter compound into said zeolite.

2. A process according to claim 1 wherein the weight ratio of said promoter compound to said zeolite employed during catalyst preparation is such that the weight ratio of promoter to zeolite in said promoted zeolite is in the range of from about 0.001:1 to about 1:1.

3. A process according to claim 1 wherein the weight ratio of said promoter compound to said zeolite employed during catalyst preparation is such that the weight ratio of promoter to zeolite in said promoted zeolite is in the range of from about 0.01:1 to about 0.5:1.

4. A process according to claim 1 wherein the molar ratio of said complexing ligand to said zeolite employed during catalyst preparation is in the range of from about 0.1:1 to about 100:1.

5. A process according to claim 1 wherein the molar ratio of said complexing ligand to said zeolite employed during catalyst preparation is in the range of from about 0.1:1 to about 10:1.

6. A process according to claim 1 wherein said promoter compound is zinc nitrate.

7. A process according to claim 1 wherein said complexing agent is ethylenediaminetetraacetic acid.

8. A process according to claim 1 wherein said hydrocarbon is propane; the weight ratio of said promoter compound to said zeolite employed during catalyst preparation is such that the weight ratio of said promoter to said zeolite in said promoted zeolite is in the range of from about 0.01:1 to about 5 0.5: 1; the molar ratio of said complexing ligand to said zeolite employed during catalyst preparation is in the range of from about 0.1:1 to about 10:1; said promoter compound is zinc nitrate; and said complexing agent is ethylenediaminetetraacetic acid.

9. A process according to claim 8 wherein said zeolite is ZSM-5.

10. A process according to claim 1 wherein said zeolite is ZSM-5.

11. A process according to claim 1 wherein said saturated hydrocarbon is propane.

12. A process comprising contacting a fluid which comprises a saturated hydrocarbon which is selected from the group consisting of ethane, propane, butane, isobutane, pentane, isopentane, hexane, isohexane, heptane, isoheptane, octane, isooctane, nonane, decane, undecane, dodecane, tridecane, tetradecane, pentadecane, and hexadecane with a catalyst composition under a condition sufficient to to convert said saturated hydrocarbon to a $C_6$ to $C_8$ aromatic hydrocarbon wherein said catalyst composition is prepared by the steps comprising: (1) combining a zeolite, a promoter compound, and a complexing ligand to produce a modified zeolite; and thereafter (2) calcining or steam-treating said modified zeolite to produce a promoted zeolite wherein said zeolite is ZSM-5; said promoter compound comprises an element selected from the group consisting of Group IA compounds, Group IIA compounds, Group IIIA compounds, Group IVA compounds, Group VA compounds, Group IIB compounds, Group IIIB compounds, Group IVB compounds, Group VIB compounds, and combinations of two or more thereof; said complexing ligand is chelating a metal compound and is selected from the group consisting of a carboxylic acid, a derivative of a carboxylic acid, an amine containing one or more hydroxy groups, and combinations of two or more thereof; and said catalyst preparation is carried out under a condition sufficient to incorporate said promoter compound into said zeolite.

13. A process according to claim 12 wherein the weight ratio of said promoter compound to said zeolite employed during catalyst preparation is such that the weight ratio of promoter to zeolite in said promoted zeolite is in the range of from about 0.001:1 to about 1:1.

14. A process according to claim 12 wherein the weight ratio of said promoter compound to said zeolite is such that the weight ratio of promoter to zeolite in said promoted zeolite employed during catalyst preparation is in the range of from about 0.01:1 to about 0.5:1.

15. A process according to claim 12 wherein the molar ratio of said complexing ligand to said zeolite employed during catalyst preparation is in the range of from about 0.01:1 to about 100:1.

16. A process according to claim 12 wherein the molar ratio of said complexing ligand to said zeolite employed during catalyst preparation is in the range of from about 0.1:1 to about 10:1.

17. A process according to claim 12 wherein said promoter compound is zinc nitrate.

18. A process according to claim 12 wherein said complexing ligand is ethylenediaminetetraacetic acid.

19. A process according to claim 12 wherein said hydrocarbon is propane; the weight ratio of said promoter compound to said zeolite employed during catalyst preparation is such that the weight ratio of said promoter to said zeolite in said promoted zeolite is in the range of from about 0.01:1 to about 0.5:1; the molar ratio of said complexing ligand to said zeolite employed during catalyst preparation is in the range of from about 0.1:1 to about 10:1; said promoter compound is zinc nitrate; and said complexing ligand is ethylenediaminetetraacetic acid.

20. A process according to claim 12 wherein said saturated hydrocarbon is propane.

* * * * *